(12) United States Patent
Umatt et al.

(10) Patent No.: US 8,369,255 B2
(45) Date of Patent: Feb. 5, 2013

(54) UNIFORM OUT-OF-SERVICE SEARCH FOR WIRELESS COMMUNICATION SYSTEMS

(75) Inventors: Bhupesh Manoharlal Umatt, Poway, CA (US); Vineet Mittal, San Diego, CA (US); Vivek Chawla, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 479 days.

(21) Appl. No.: 12/447,010

(22) PCT Filed: Oct. 25, 2007

(86) PCT No.: PCT/US2007/082545
§ 371 (c)(1),
(2), (4) Date: Jun. 15, 2009

(87) PCT Pub. No.: WO2008/052123
PCT Pub. Date: May 2, 2008

(65) Prior Publication Data
US 2010/0002611 A1    Jan. 7, 2010

Related U.S. Application Data

(60) Provisional application No. 60/862,948, filed on Oct. 25, 2006.

(51) Int. Cl.
*G08C 17/00* (2006.01)
(52) U.S. Cl. .......................... 370/311; 370/329; 370/350
(58) Field of Classification Search .................. 370/311, 370/329, 350
See application file for complete search history.

(56) References Cited

U.S. PATENT DOCUMENTS

| 5,627,882 | A |   | 5/1997 | Chien et al. |
| 5,995,829 | A | * | 11/1999 | Broderick ..................... 455/418 |
| 6,073,035 | A | * | 6/2000 | Witter .......................... 455/574 |
| 6,108,542 | A |   | 8/2000 | Swanchara et al. |
| 6,580,700 | B1 |   | 6/2003 | Pinard et al. |

(Continued)

FOREIGN PATENT DOCUMENTS

| EP | 1450240 A2 | 8/2004 |
| JP | 09215040   | 8/1997 |

(Continued)

OTHER PUBLICATIONS

International Search Report—PCT/US07/082545, International Search Authority—European Patent Office—Mar. 28, 2008.

(Continued)

*Primary Examiner* — Dang Ton
*Assistant Examiner* — Robert M Morlan
(74) *Attorney, Agent, or Firm* — Kevin T. Cheatham

(57) ABSTRACT

Techniques for performing uniform out-of-service (UOOS) search to detect for wireless systems are described. The UOOS search is "uniform" in that sleep cycle and/or awake period are fixed. A wireless device transitions to an OOS state upon detection of OOS conditions for a radio access technology (RAT). The wireless device performs system search during the awake period of each sleep cycle while in the OOS state. The awake period may have a first fixed time duration, and the sleep cycle may have a second fixed time duration. In each awake period, the wireless device may either start a new search or resume a prior search based on saved state information if the search was not completed in a prior awake period. In each awake period, the wireless device may (i) start and complete a search for recently acquired frequency channels and systems and (ii) start or resume a search for other frequency channels and systems in one or more RATs.

37 Claims, 9 Drawing Sheets

U.S. PATENT DOCUMENTS

| | | | |
|---|---|---|---|
| 6,799,030 B2 * | 9/2004 | Barber et al. | 455/343.1 |
| 2004/0043798 A1 * | 3/2004 | Amerga et al. | 455/574 |
| 2004/0116110 A1 * | 6/2004 | Amerga et al. | 455/422.1 |
| 2005/0136911 A1 * | 6/2005 | Csapo et al. | 455/423 |

FOREIGN PATENT DOCUMENTS

| | | |
|---|---|---|
| JP | 9331567 A | 12/1997 |
| JP | 10173590 A | 6/1998 |
| JP | 10248080 A | 9/1998 |
| JP | 2000354275 A | 12/2000 |
| JP | 2001102990 A | 4/2001 |
| JP | 2001196969 A | 7/2001 |
| JP | 2003174682 A | 6/2003 |
| JP | 2004153311 A | 5/2004 |
| JP | 2005223711 A | 8/2005 |
| JP | 2005535151 A | 11/2005 |
| JP | 2006060671 A | 3/2006 |
| JP | 2006157546 A | 6/2006 |
| WO | WO2005051019 A1 | 6/2005 |

OTHER PUBLICATIONS

Jaap C Haartsen: "The Bluetooth Radio System" IEEE Personal Communications, IEEE Communications Society, US, vol. 7, No. 1, Feb. 2000, pp. 28-36, XP011092382 ISSN: 1070-9916 p. 32, left and right columns.

Taiwan Search Report—TW096140162—TIPO—Aug. 10, 2011.

Written Opinion—PCT/US2007/082545—ISA/EPO—Mar. 28, 2008.

\* cited by examiner

UOOS search with fixed awake period and fixed sleep cycle

UOOS search with fixed awake period and variable sleep cycle

UOOS search with fixed duty cycle for awake period $\eta = T_{awake,1}/T_{cycle,1} = T_{awake,2}/T_{cycle,2}$

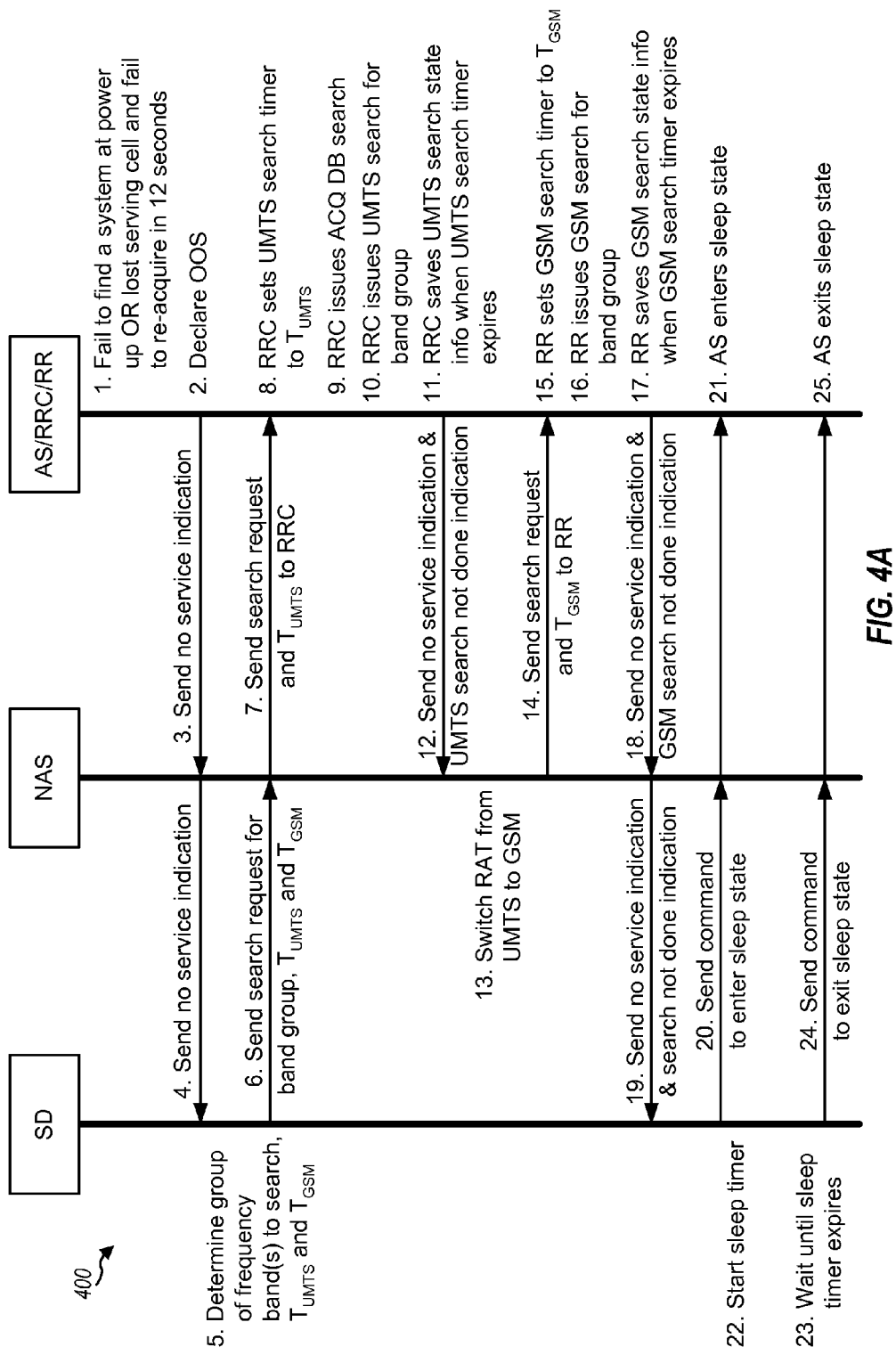

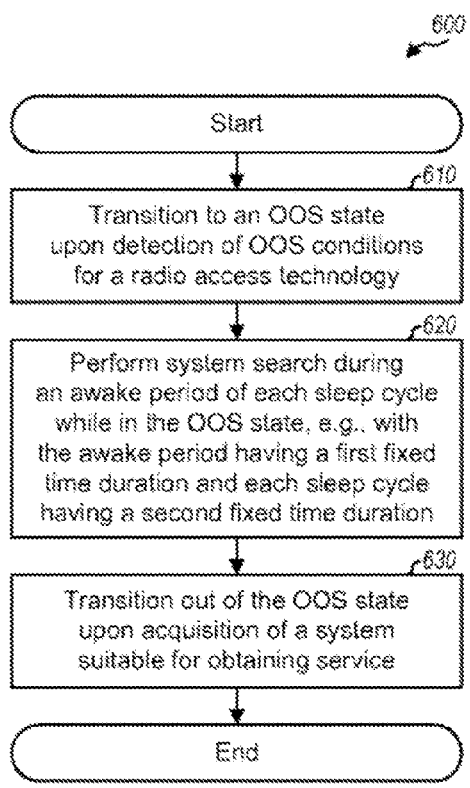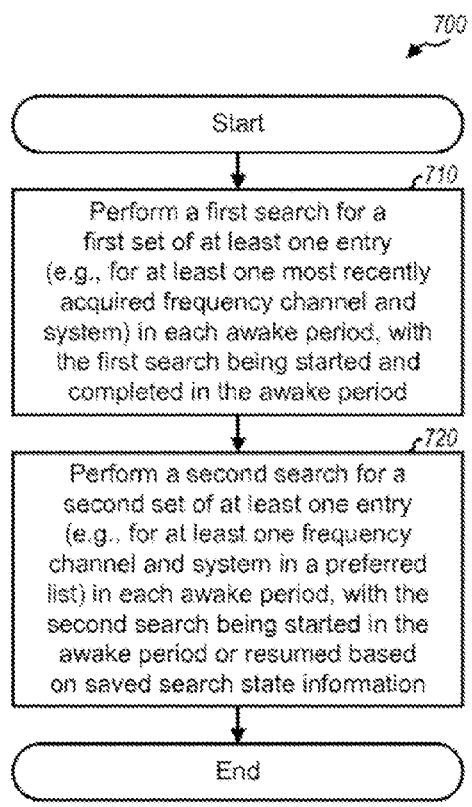
FIG. 6
FIG. 7

UNIFORM OUT-OF-SERVICE SEARCH FOR WIRELESS COMMUNICATION SYSTEMS

The present application claims priority to provisional U.S. Application Ser. No. 60/862,948, entitled "UMTS UNIFORM OUT-OF-SERVICE (OOS) SEARCH OF OOS IN IDLE AND CONNECTED MODE," filed Oct. 25, 2006, assigned to the assignee hereof and incorporated herein by reference.

BACKGROUND

I. Field

The present disclosure relates generally to communication, and more specifically to techniques for searching for wireless communication systems.

II. Background

Wireless communication systems are widely deployed to provide various communication services such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless device (e.g., a cellular phone) may be able to receive service from one or more wireless systems. Upon power up, the wireless device may search for a wireless system from which it may receive service. If a system is found, then the wireless device may register with the system. The wireless device may then actively communicate with the system or go into an idle mode if communication is not required. If the wireless device subsequently loses the system, then it may enter an out-of-service (OOS) state and attempt to acquire a system from which service may be obtained.

The wireless device may not have any knowledge of its operating environment while in the OOS state and may not know which systems, if any, can be acquired. The wireless device may also have no knowledge on when it may be able to acquire a system since this may depend on various factors such as user mobility. The wireless device may consume a large amount of battery power if it continuously searches for systems while in the OOS state. This heavy battery power consumption may significantly reduce both standby time and talk time, especially when the OOS duration is long. The wireless device may search for systems infrequently in order to conserve battery power. However, the infrequent search may significantly delay system acquisition.

There is therefore a need in the art for techniques to efficiently search for wireless systems in the OOS state.

SUMMARY

Techniques for performing uniform OOS (UOOS) search to detect for systems while in the OOS state are described herein. The UOOS search is "uniform" in that sleep cycle and/or awake period are fixed or constant during the UOOS search. A sleep cycle is one period or cycle of a sleep state and an awake state. An awake period is the duration of time in the awake state.

In an aspect, a wireless device may transition to the OOS state upon detection of OOS conditions for a radio access technology (RAT). The wireless device may perform system search during the awake period of each sleep cycle while in the OOS state. The awake period may have a first fixed time duration, and the sleep cycle may have a second fixed time duration. In each awake period, the wireless device may either start a new search or resume a prior search based on state information saved in a prior awake period if the search was not completed in the prior awake period. The wireless device may save state information for the current search if it is not completed in the current awake period. The wireless device may transition out of the OOS state upon acquisition of a system suitable for obtaining service.

In one design of the system search, the wireless device may perform a first search for a first set of at least one entry in each awake period, with the first search being started and completed in the awake period. The first set of at least one entry may include one or more frequency channels and systems acquired recently and stored in an acquisition database or table. The wireless device may also perform a second search for a second set of at least one entry in each awake period, with the second search being started or resumed in the awake period. If the second search was not completed in the prior awake period, then the second search may be resumed in the current awake period based on state information saved in the prior awake period. If the second search is not completed in the current awake period, then state information for the second search may be saved for use in the next awake period. The second search may be skipped if a suitable system is found by the first search. The second set of at least one entry may include one or more frequency channels and systems in a preferred list and/or other frequency channels and systems. The second search may include searches for different RATs, e.g., for Universal Mobile Telecommunication System (UMTS) and Global System for Mobile Communications (GSM), for CDMA2000 1X (1X) and High Rate Packet Data (HRPD), or for some other combination of RATs.

Various aspects and features of the disclosure are described in further detail below.

BRIEF DESCRIPTION OF THE DRAWINGS

FIGS. 4A to 4C show a design of UOOS search for a dual-mode wireless device supporting UMTS and GSM.

FIG. 6 shows a process for performing UOOS search.

FIG. 7 shows a process for performing system search while in the OOS state.

DETAILED DESCRIPTION

The search techniques described herein may be used for various wireless communication systems such as CDMA, TDMA, FDMA, OFDMA, and SC-FDMA systems. The terms "system" and "network" are often used interchangeably. A CDMA system may implement a RAT such as cdma2000, Universal Terrestrial Radio Access (UTRA), etc. The terms "radio access technology", "RAT", "radio technology", and "air interface" are often used interchangeably. cdma2000 covers IS-2000, IS-95 and IS-856 standards.

IS-2000 is also referred to as CDMA2000 1X, 1X, etc. IS-856 is also referred to as HRPD, CDMA2000 1xEV-DO, 1xEV-DO, DO, High Data Rate (HDR), etc. UTRA includes Wideband-CDMA (W-CDMA) and Time Division-Synchronous CDMA (TD-SCDMA). A TDMA system may implement a RAT such as GSM. An OFDMA system may implement a RAT such as Evolved UTRA (E-UTRA), IEEE 802.20, Flash-OFDM®, etc. UTRA and E-UTRA are part of UMTS, and Long Term Evolution (LTE) is an upcoming release of UMTS utilizing E-UTRA. UTRA, E-UTRA, UMTS, GSM and LTE are described in documents from an organization named "3rd Generation Partnership Project" (3GPP). cdma2000 is described in documents from an organization named "3rd Generation Partnership Project 2" (3GPP2). These various RATs and standards are known in the art.

GSM and IS-95 are second-generation (2G) RATs that can provide voice service and low to medium rate packet data service. UMTS, IS-2000, and IS-856 are third-generation (3G) RATs that can provide enhanced services and capabilities, e.g., higher data rates, concurrent voice and data calls, etc. A network operator/service provider may deploy one or more systems utilizing one or more RATs.

Figure 1:
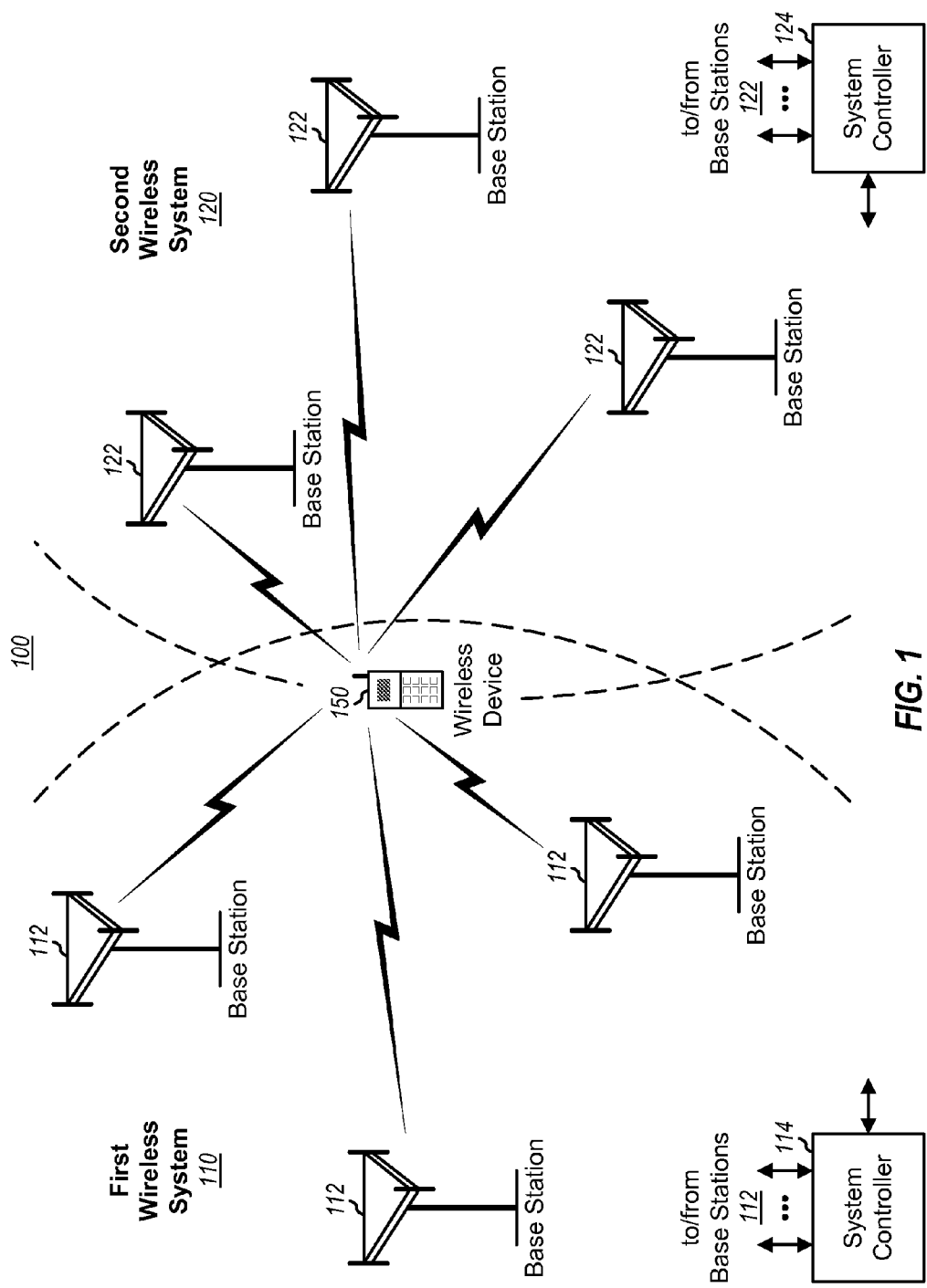
FIG. 1 shows a deployment with two wireless communication systems.

FIG. 1 shows a deployment 100 that includes a first wireless system 110 and a second wireless system 120. System 110 may be a GSM system, and system 120 may be a UMTS system. System 110 may also be a 1X system, and system 120 may be an HRPD system. Systems 110 and 120 may also be systems utilizing other RATs.

System 110 includes base stations 112 that communicate with wireless devices within the coverage area of system 110. A base station is generally a fixed station that communicates with the wireless devices and may also be referred to as a Node B, an evolved Node B (eNode B), an access point, etc. A system controller 114 couples to base stations 112 and provides coordination and control for these base stations. System 120 includes base stations 122 that communicate with wireless devices within the coverage area of system 120. A system controller 124 couples to base stations 122 and provides coordination and control for these base stations. System controllers 114 and 124 may each comprise one or more network entities such as a Mobile Switching Center (MSC), a Radio Network Controller (RNC), a Packet Control Function (PCF), etc. System controller 114 may communicate with system controller 124 to support inter-working between systems 110 and 120.

A system typically includes many cells, where the term "cell" can refer to a base station or the coverage area of the base station, depending on the context in which the term is used. In the following description, base stations 112 and 122 may be referred to as cells.

A wireless device 150 may be able to communicate with system 110 and/or system 120, typically with one system at any given moment. Wireless device 150 may be stationary or mobile and may also be referred to as a user equipment (UE), a mobile station (MS), a terminal, an access terminal, a mobile equipment, a subscriber unit, a station, etc. Wireless device 150 may be a cellular phone, a personal digital assistant (PDA), a wireless modem, a handheld device, a laptop computer, etc.

Wireless device 150 may search for systems upon power up. If a system is found, then the wireless device may operate in either (i) a connected mode and actively communicate with the system to obtain service or (ii) an idle mode and camp on the system if communication is not required. The wireless device may fail to acquire a system at power up (e.g., if it is in an area with no service) or may lose an acquired system while in the idle or connected mode (e.g., due to user mobility or radio link failure). The wireless device may then enter an OOS state and search for systems suitable for camping or obtaining service.

In general, the wireless device may enter the OOS state based on various criteria. In one design, the wireless device may enter the OOS state immediately upon failure to acquire a system during power up or upon loss of an acquired system in the idle or connected mode. In another design, the wireless device may wait some amount of time after system acquisition failure at power up or after system loss in the idle or connected mode and then enter the OOS state. For example, the wireless device may be in the idle mode and may periodically demodulate a paging channel during assigned paging slots, which may be spaced apart by a predetermined time interval. The wireless device may either (i) declare system loss after failure to demodulate the paging channel and immediately enter the OOS state or (ii) continue to attempt to demodulate the paging channel in each paging slot and declare system loss and enter the OOS state after a predetermined number of unsuccessful demodulation attempts. The wireless device may also continuously search for systems for a predetermined period of time prior to entering the OOS state.

In an aspect, the wireless device performs a uniform OOS (UOOS) search to detect for systems while in the OOS state. For the UOOS search, the wireless device may sleep for much of the time and may wake up periodically to search for systems. The UOOS search is "uniform" in that the sleep cycle and/or the awake period are fixed during the UOOS search. A sleep cycle is one period or cycle of a sleep state and an awake state. The wireless device may power down as much circuitry as possible during the sleep state in order to conserve battery power and may search for systems during the awake state. The UOOS search may be performed in various manners.

Figure 2A:
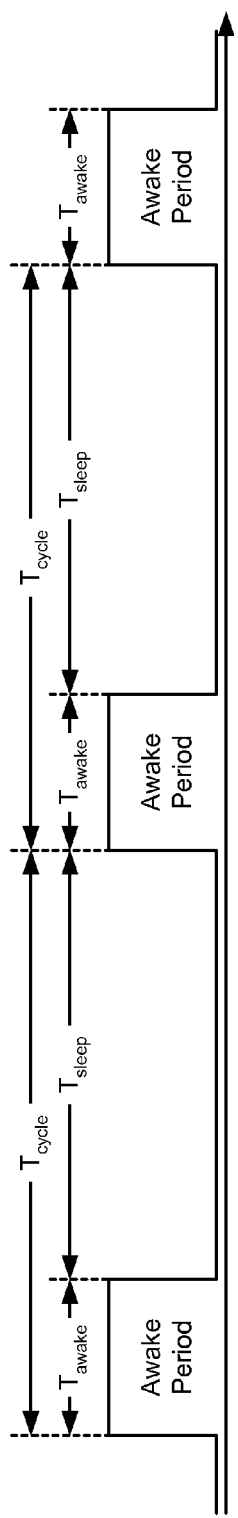
FIG. 2A shows UOOS search with fixed awake period and fixed sleep cycle.

FIG. 2A shows a design of the UOOS search with a fixed awake period and a fixed sleep cycle. In this design, the wireless device may wake up every $T_{cycle}$ seconds and perform system search for $T_{awake}$ seconds each time the wireless device is awake. The sleep cycle may be fixed and equal to $T_{cycle}$ seconds, and the awake period may also be fixed and equal to $T_{awake}$ seconds. $T_{cycle}$ and $T_{awake}$ may be selected based on various factors such as system acquisition performance, battery life consideration, etc. A short sleep cycle and/or a long awake period may be selected for potentially faster system acquisition with higher battery power consumption. Conversely, a long sleep cycle and/or a short awake period may be selected for longer battery life with potentially slower system acquisition. In one design, $T_{cycle}$ is approximately 40 seconds, and $T_{awake}$ is approximately 6 seconds. Other values may also be used for $T_{cycle}$ and $T_{awake}$ in other designs. $T_{cycle}$ and/or $T_{awake}$ may also be configurable (e.g., by the service provider) and selected based on the desired performance.

Figure 2B:
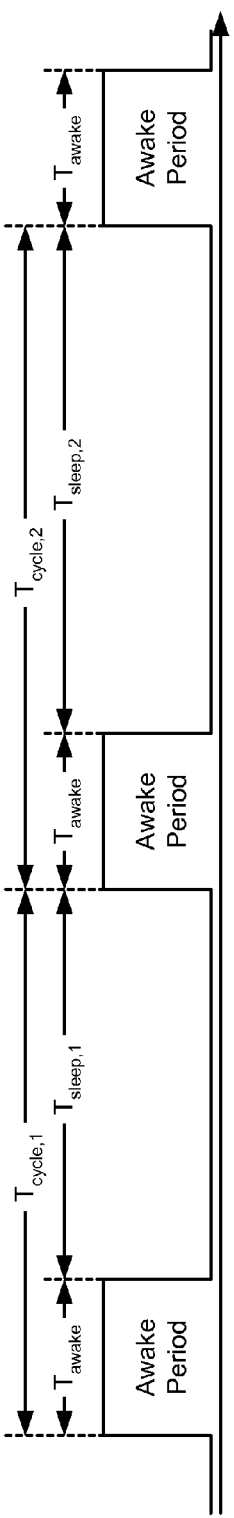
FIG. 2B shows UOOS search with fixed awake period and variable sleep cycle.

FIG. 2B shows a design of the UOOS search with a fixed awake period and a variable sleep cycle. In this design, the wireless device may wake up periodically and perform system search for $T_{awake}$ seconds each time the wireless device is awake. The sleep cycle may vary over time, but the awake period may be fixed and equal to $T_{awake}$ seconds. For example, the sleep cycle may be shorter when the wireless device first enters the OOS state and may be longer after the wireless device has been in the OOS state for some period of time.

Figure 2C:
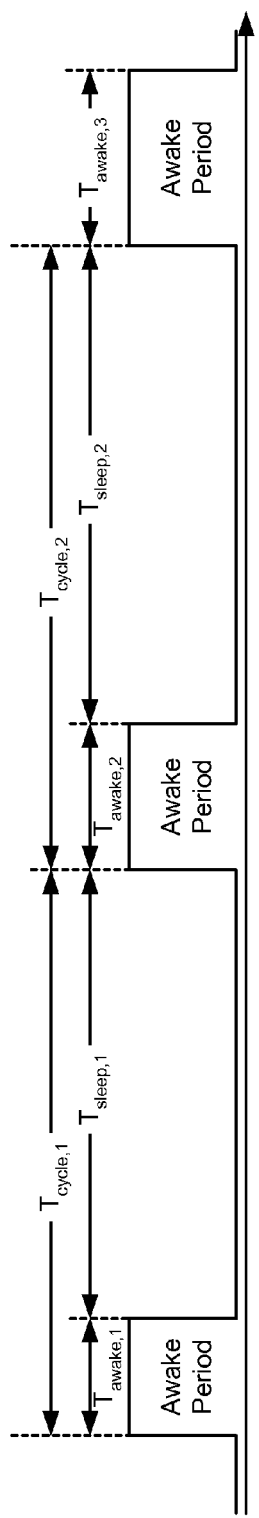
FIG. 2C shows UOOS search with fixed duty cycle for the awake period.

FIG. 2C shows a design of the UOOS search with a variable sleep cycle and an awake period having a fixed duty cycle. In this design, the wireless device may wake up periodically and perform system search each time the wireless device is awake. The sleep cycle may vary over time and selected based on various factors. The awake period may be a predetermined percentage of the sleep cycle, or $T_{awake,i} = \eta \cdot T_{cycle,i}$, where $T_{cycle,i}$ is the duration of the i-th sleep cycle, $T_{awake,i}$ is the awake period for the i-th sleep cycle, and η is a fixed duty cycle for the awake period. The awake period may thus be longer for a longer sleep cycle and shorter for a shorter sleep cycle. η may be selected based on the desired battery life.

The designs shown in FIGS. 2A and 2C may be able to provide good battery life since the wireless device is awake for a fixed percentage of time to perform system search. The awake percentage may be selected based on the available battery power and power consumption during system search in order to achieve the desired OOS battery time. The design shown in FIG. 2B may be able to guard against excessive battery power consumption since the wireless device is awake for a fixed period of time in each sleep cycle. The UOOS search may also be performed in other manners. For example, the sleep cycle may be fixed, and the awake period may be varied within a predetermined range.

The wireless device may perform various types of searches during the awake periods while in the OOS state. For example, the following searches may be performed:

Partial search—search for systems recently acquired by the wireless device,

Preferred search—search for preferred systems for the wireless device, and

Full search—search for all systems that can be received by the wireless device.

The preferred search may also be referred to as an automatic search. The full search may also be referred to as a manual search.

Each system may operate on one or more specific frequency channels within a specific frequency band. Table 1 lists some frequency bands that are commonly used for UMTS, GSM, 1X and HRPD.

TABLE 1

| Frequency Band | Frequency Band | Uplink (MHz) | Downlink (MHz) | Common Name |
|---|---|---|---|---|
|  | UMTS Band I | 1920-1980 | 2110-2170 | IMT-2000 |
| GSM 1900 | UMTS Band II | 1850-1910 | 1930-1990 | PCS |
| GSM 1800 | UMTS Band III | 1710-1785 | 1805-1880 | DCS |
|  | UMTS Band IV | 1710-1770 | 2110-2170 |  |
| GSM 850 | UMTS Band V | 824-849 | 869-894 | Cellular |
| W-CDMA 800 | UMTS Band VI | 830-840 | 875-885 |  |
| GSM 900 |  | 890-915 | 935-960 |  |

A frequency band used for GSM (or a GSM band) covers a number of 200 KHz radio frequency (RF) channels. Each RF channel is identified by a specific ARFCN (absolute radio frequency channel number). For example, the GSM 900 band covers ARFCNs 1 through 124, the GSM 850 band covers ARFCNs 128 through 251, the GSM 1800 band covers ARFCNs 512 through 885, and the GSM 1900 band covers ARFCNs 512 through 810. A GSM system typically operates on a specific set of RF channels in a specific GSM band.

A frequency band used for UMTS (or a UMTS band) may cover multiple UMTS channels that may be spaced apart by approximately 5 MHz. Each UMTS channel has a bandwidth of 3.84 MHz and a center frequency that is given in 200 KHz resolution. Each UMTS channel is identified by a specific channel number, which may be a UARFCN (UTRA ARFCN). A UMTS system typically operates on one or more specific UMTS channels.

A frequency band used for 1X or HRPD (or a CDMA band) may cover multiple CDMA channels. A CDMA channel may be a 1X channel if used for 1X or an HRPD channel if used for HRPD. Each CDMA channel has a bandwidth of 1.23 MHz and a center frequency that is given by a channel number. A 1X system typically operates on one or more specific 1X channels. An HRPD system typically operates on one or more specific HRPD channels.

The wireless device may maintain an acquisition database (ACQ DB) that stores a list of entries for frequency channels and systems that have been acquired previously by the wireless device. Each entry may include a frequency channel, a scrambling code, system identification information, and/or other pertinent information to acquire the associated system. The acquisition database may include a predetermined number of (e.g., 10) entries for the most recently acquired frequency channels and systems. These entries may be stored in a circular buffer so that a new entry replaces the oldest entry in the acquisition database.

The wireless device may perform a partial search for one or more entries in the acquisition database prior to performing a preferred search or a full search. This may be desirable for several reasons. First, the wireless device has previously acquired the frequency channels and systems in the acquisition database, so the likelihood of acquiring these frequency channels and systems again may be good. Second, the wireless device may have pertinent information such as scrambling code and may be able to acquire these frequency channels and systems more quickly. Third, the wireless device may use the results of the partial search to reduce the search space for the preferred search or full search, e.g., to avoid acquisition attempts on frequency channels where systems will not be present.

The wireless device may be provisioned with a list of preferred systems from which the wireless device may receive service. This preferred list may be referred to as a preferred public land mobile network (PLMN) list in UMTS, a preferred roaming list (PRL) in cdma2000, etc. The preferred list may include a number of entries for systems (or PLMNs) that may be received by the wireless device. Each entry may include system identification information, frequency channel and band information, and/or other pertinent information used to acquire an associated system. The system identification information may comprise a PLMN ID in UMTS, System Identification (SID) and Network Identification (NID) in cdma2000, etc. The preferred list may be provisioned on the wireless device by a service provider with which the wireless device has a subscription. The preferred list may include a home system and other systems for which the service provider has roaming agreements. The preferred list may be stored in a Subscriber Identity Module (SIM), a Universal SIM (USIM), or some other non-volatile memory module.

The wireless device may perform a preferred search for the frequency channels and systems in the preferred list whenever directed, e.g., by the UOOS search algorithm. For the preferred search, the wireless device may search all or a subset of the frequency channels in the preferred list to look for the preferred systems. The wireless device may also perform a full search for all available systems whenever directed, e.g., by the UOOS search algorithm or by the user. For the full search, the wireless device may search one or more frequency channels in one or more frequency bands supported by the wireless device in order to look for any systems.

In general, the wireless device may evaluate one or more frequency channels in one or more frequency bands to look for systems in a given search while in the OOS state. The processing to be performed for the search may be dependent on the RAT, e.g., UMTS, GSM, 1X, HRPD, etc. The amount of time to complete the search may be dependent on various factors such as, e.g., the number of frequency channels to search, radio link conditions, search processing for a RAT being searched, etc. The search may span one or multiple sleep cycles, depending on the search time and the awake period. If the search is not completed prior to the end of a given awake period, then state information for the search may be saved, and the search may be resumed in the next awake period. For clarity, the UOOS search is specifically described below for UMTS/GSM and also for 1X/HRPD.

1. UOOS Search for UMTS and GSM

Figure 3:
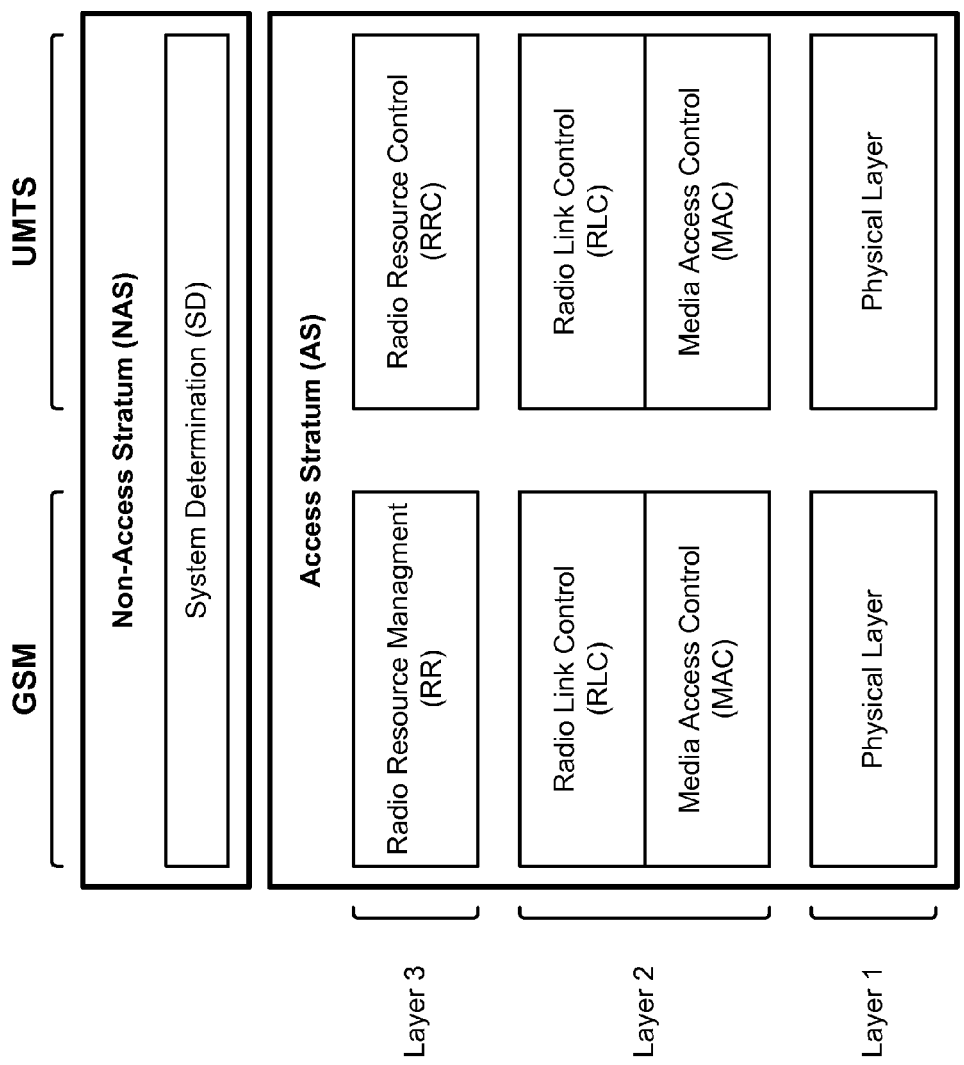
FIG. 3 shows protocol layers for UMTS and GSM.

FIG. 3 shows various layers for UMTS and GSM. GSM includes a Non Access Stratum (NAS) and an Access Stratum (AS). NAS comprises functions and protocols that support traffic and signaling between a wireless device and a core network with which a GSM system interfaces. AS comprises functions and protocols that support communication between the wireless device and an MSC within the GSM system. For GSM, AS includes a Radio Resource (RR) management sublayer, a Radio Link Control (RLC) sublayer, a Medium Access Control (MAC) sublayer, and a physical layer. RR is in Layer 3. RLC and MAC are sublayers of Layer 2. The physical layer is also referred to as Layer 1. UMTS similarly includes NAS and AS. For UMTS, AS includes a Radio Resource Control (RRC) at Layer 3, RLC and MAC sublayers at Layer 2, and a physical layer at Layer 1.

NAS and RRC may perform various functions for system search and for establishing, maintaining, and terminating calls in UMTS. NAS and RR may perform similar functions for system search and calls in GSM. For simplicity, only functions related to system search are described below. The terms "search" and "scan" are often used interchangeably. RRC functions may be implemented by an RRC module within the wireless device, and RR functions may be implemented by an RR module.

A system determination (SD) module may interact with NAS and direct system search while in the OOS state. SD may receive an indication of no service from RRC or RR. SD may enter the OOS state if the wireless device (i) powered up in an area with no service or (ii) lost service while in the idle or connected mode and failed to re-acquire the serving cell within the time specified by 3GPP (e.g., 12 seconds in the idle mode). SD may initiate UOOS search and interact with NAS for searches while in the OOS state. SD may terminate the UOOS search and exit the OOS state when a suitable system is found, a call is originated, a key is pressed by the user, etc.

Figure 4B:
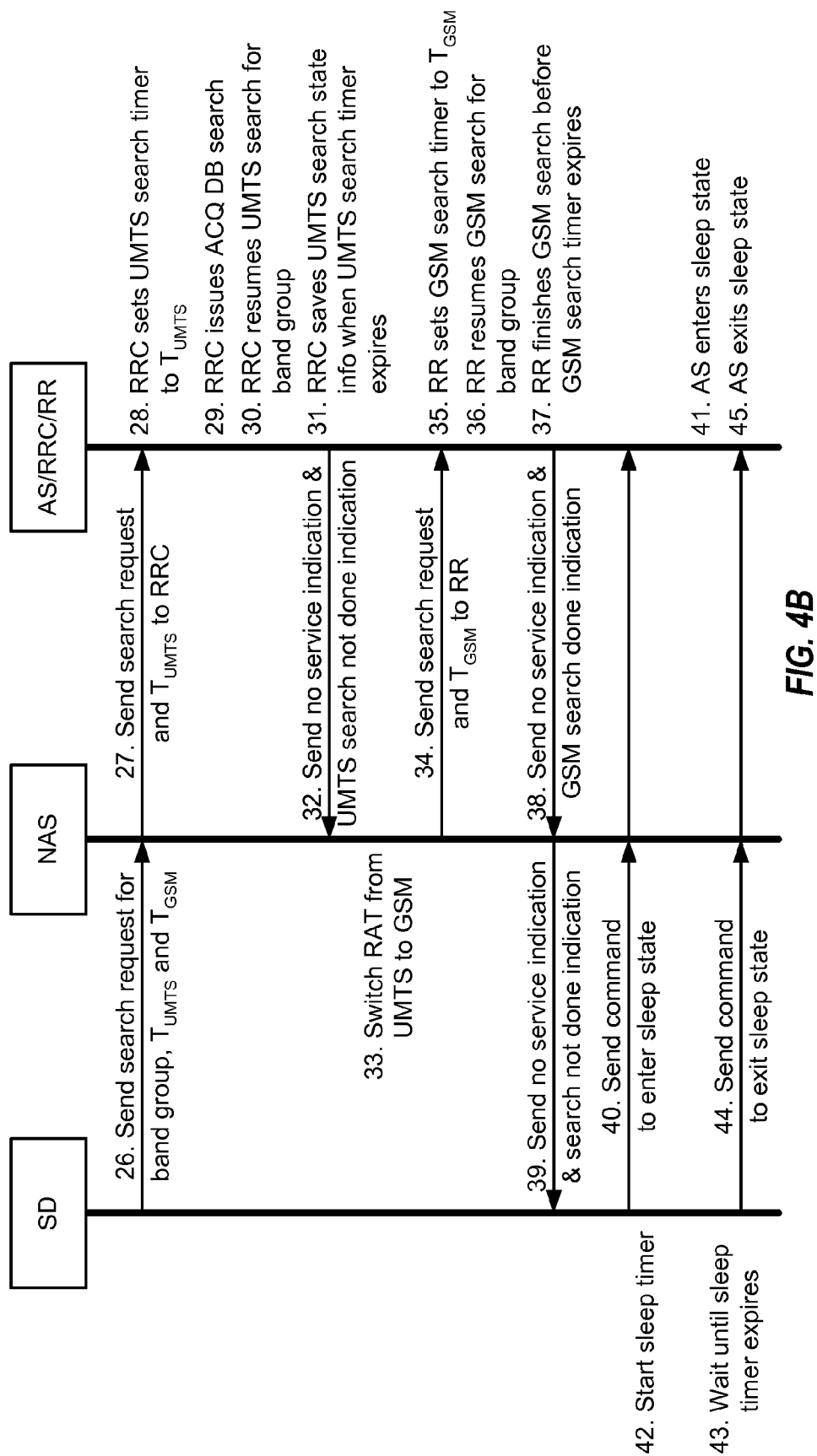
Figure 4C:
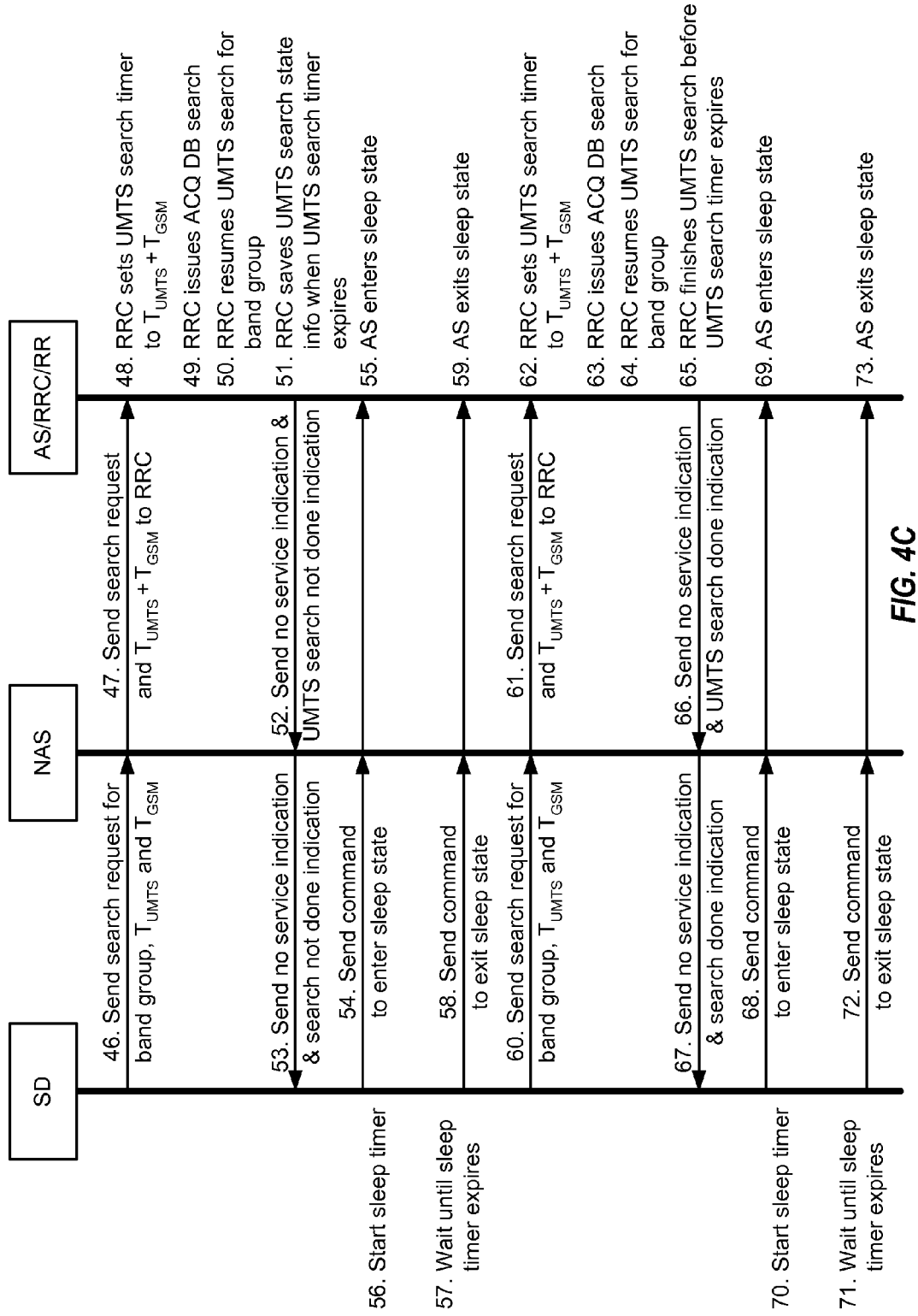

FIGS. 4A to 4C show a design of a process 400 for performing idle mode UOOS search for UMTS and GSM systems in a dual-mode wireless device. In this design, RRC directs UMTS searches, which are searches for UMTS systems, and RR directs GSM searches, which are searches for GSM systems. NAS directs the operation of RRC and RR. SD manages the UOOS search, determines when to sleep and when to wake up, determines which frequency band(s) to search, and determines the amount of time for UMTS search (which is denoted as $T_{UMTS}$) and the amount of time for GSM search (which is denoted as $T_{GSM}$) in each awake period.

FIG. 4A shows the start of the UOOS search for UMTS and GSM. Initially, the wireless device may fail to find a system at power up or may lose the serving cell and fail to re-acquire this cell in 12 seconds (step 1). The wireless device may then declare OOS (step 2). An indication of no service may be sent by RRC (if UMTS is the current RAT) or RR (if GSM is the current RAT) to NAS (step 3). NAS may forward the no service indication to SD (step 4). SD may determine a group of one or more frequency bands to search for service (step 5). For the first search after declaring OOS, the band group may include frequency bands on which the wireless device primarily operates. For example, the band group may include PCS and cellular bands if the wireless device operates primarily in the United States, GSM 900 and IMT-2000 bands if the wireless device operates primarily in Europe, W-CDMA 800 and IMT-2000 bands if the wireless device operates primarily in Japan, etc. For a subsequent search, the band group may include other frequency bands supported by the wireless device and not searched recently. The band group may also include only frequency channels known to be used by the service provider, which may reduce search time. SD may also determine the UMTS search time, $T_{UMTS}$, and the GSM search time, $T_{GSM}$, which may be selected such that $T_{UMTS}$ plus $T_{GSM}$ does not exceed the next awake period (also step 5). The awake period may be selected to be sufficiently long, e.g., to allow for full or partial search of two frequency bands for each RAT. For UMTS, $T_{UMTS}$ may be selected to allow for search of entries in the acquisition database plus a predetermined number of (e.g., 10) frequency channels. In one design, $T_{UMTS} \geq 4$ seconds, $T_{GSM} \geq 2$ seconds, and $T_{awake} \geq 6$ seconds.

For the first awake period, SD may send a search request for the band group as well as $T_{UMTS}$ and $T_{GSM}$ to NAS (step 6). NAS may elect to perform UMTS search prior to GSM search and may then send a search request and $T_{UMTS}$ to RRC (step 7). Upon receiving the search request, RRC may set a UMTS search timer to $T_{UMTS}$ (step 8). RRC may then issue an ACQ DB search, which may be a partial search for all or a subset of the entries in the acquisition database (step 9). If a system is found by the ACQ DB search, then RRC may return an indication of service found (not shown in FIG. 4A). If no system is found by the ACQ DB search, then RRC may issue a UMTS search for the band group received from SD (step 10). If the UMTS search is not completed by the time the UMTS search timer expires, then RRC may save UMTS search state information when the timer expires (step 11). This state information may include results for UMTS channels that have been searched and information on where to resume the UMTS search in the next awake period. In one design, RRC may send a no service indication and an indication that the UMTS search is not done upon expiration of the UMTS search timer, regardless of whether or not any system has been found by the completed portion of the UMTS search (step 12). In another design, RRC may report systems found thus far by the completed portion of the UMTS search (not shown in FIG. 4A). If the UMTS search is completed prior to expiration of the UMTS search timer, then RRC may report the search result immediately. Alternatively, RRC may perform the ACQ DB search again, followed by a new UMTS search until the UMTS search timer expires. If RRC finds a valid signal in UMTS, then RRC may break out of UOOS operation, complete the search on remaining frequency channels in a continuous (or non-UOOS) fashion, and then inform NAS of the search results (e.g., the available systems). This may be done in order the speed up system acquisition once the wireless device knows that at least one system can be acquired.

NAS may switch RAT from UMTS to GSM upon receiving the indications from RRC (step 13). NAS may then send a search request and $T_{GSM}$ to RR (step 14). Upon receiving the search request, RR may set a GSM search timer to $T_{GSM}$ (step 15). RR may then issue a GSM search for the band group received from SD (step 16). If the GSM search is not completed by the time the GSM search timer expires, then RR may save GSM search state information when the timer expires (step 17). In one design, RR may send a no service indication and an indication that the GSM search is not done upon expiration of the GSM search timer, regardless of whether or not any system has been found by the completed portion of the GSM search (step 18). In another design, RR may report systems found thus far by the completed portion of the GSM search (not shown in FIG. 4A). If a valid GSM signal is found, then the wireless device may break out of UOOS operation, finish the search on remaining frequency channels and/or RAT in a continuous fashion, and then report the search results to NAS.

NAS may send a no service indication and a search not done indication to SD upon receiving the indications from RR (step 19). SD may then send a command to enter sleep (step 20), and AS may enter the sleep state upon receiving the command from SD (step 21). Concurrently, SD may set a sleep timer to the sleep cycle minus the awake period and may start the sleep timer (step 22). SD may wait until the sleep timer expires, which indicates the start of the next awake period (step 23). SD may then send a command to exit sleep (step 24), and AS may exit the sleep state upon receiving the command from SD (step 25).

Steps 6 through 25 may be performed for each subsequent awake period. However, in step 10, RRC may resume the UMTS search from where it was left off in the previous awake period based on the saved UMTS search state information. Similarly, in step 16, RR may resume the GSM search from where it was left off in the previous awake period based on the saved GSM search state information FIG. 4B shows a case in which the GSM search is completed before the UMTS search. Steps 26 through 45 in FIG. 4B are for one awake period and correspond to steps 6 through 25, respectively, in FIG. 4A. RR may resume the GSM search from where it was left off in the previous awake period (step 36) and may complete the GSM search prior to expiration of the GSM search timer (step 37). RR may then send to NAS (i) a no service indication if no system was found and (ii) an indication that the GSM search is done (step 38). Since the GSM search is done but the UMTS search is not done, NAS may send a no service indication and a search not done indication to SD (step 39).

FIG. 4C shows a case in which the UMTS search is performed and completed after the GSM search has been completed. Steps 46 through 59 in FIG. 4C are for one awake period. SD may send a search request for the band group as well as $T_{UMTS}$ and $T_{GSM}$ to NAS (step 46). Since the GSM search is done, NAS may use both $T_{UMTS}$ and $T_{GSM}$ for the UMTS search. NAS may then send a search request and $T_{UMTS}+T_{GSM}$ to RRC (step 47). RRC may set the UMTS search timer to $T_{UMTS}+T_{GSM}$ (step 48), then issue an ACQ DB search (step 49), and then resume the UMTS search (step 50). RRC may save UMTS search state information when the timer expires (step 51) and then send a no service indication and a UMTS search not done indication to NAS (step 52). Steps 53 through 59 correspond to steps 19 through 25, respectively, in FIG. 4A. Steps 46 through 59 may be performed for each subsequent awake period until RRC completes the UMTS search.

Steps 60 through 73 in FIG. 4C are for one awake period in which the UMTS search is completed and correspond to steps 46 through 59, respectively. RRC may resume the UMTS search from where it was left off in the previous awake period (step 64) and may complete the UMTS search prior to expiration of the UMTS search timer (step 65). RRC may then send to NAS (i) a no service indication if no system was found and (ii) an indication at the UMTS search is done (step 66). Since the GSM and UMTS searches are done but no system was found, NAS may send a no service indication and a search done indication to SD (step 67). Steps 68 through 73 correspond to steps 20 through 25, respectively, in FIG. 4A.

For UMTS search, the wireless device may perform one or more frequency scans to detect for strong UARFCNs in a frequency band. The wireless device may then attempt acquisition on each strong UARFCN, e.g., using a three-step process. In step one, the wireless device may search for a 256-chip primary synchronization code (PSC) sent on a primary synchronization channel (SCH) by correlating the received signal at the wireless device with a locally generated PSC at different time offsets. The wireless device may use the PSC to detect for the presence of a cell and to ascertain the slot timing of that cell. In step two, the wireless device may determine a pattern of secondary synchronization codes (SSCs) used by each cell for which the PSC has been detected. The wireless device can determine frame timing and a scrambling code group used for a cell based on the detected SSC pattern for that cell. In step three, the wireless device may determine the scrambling code used by each cell for which the SSC pattern has been detected. Each SSC pattern is associated with a group of eight scrambling codes. The wireless device may evaluate each of the eight scrambling codes to determine which scrambling code is used by the cell.

For GSM search, the wireless device may perform a power scan to measure received power of each RF channel in a frequency band and may identify strong RF channels. The wireless device may then attempt acquisition on each strong RF channel by (i) detecting for a tone sent on a frequency correction channel (FCCH), (ii) decoding a burst sent on a synchronization channel (SCH) to obtain a base transceiver station identity code (BSIC) for a GSM cell, and (iii) decoding a broadcast control channel (BCCH) to obtain system information.

In general, any number of RATs may be supported, e.g., only UMTS, only GSM, both UMTS and GSM, etc. The awake period may be divided among the supported RATs in any manner. In each awake period, each RAT may be allocated some or all of the awake period for search on that RAT, depending on the RAT(s) being searched in that awake period. Since a limited amount of time may be allocated to each RAT for system search, it make take more than one awake period to finish the system search for the RAT, e.g., in poor channel conditions.

SD may initiate searches in different band groups and/or of different types in sequential manner. For example, SD may send a search request for PCS and cellular bands, followed by a search request for IMT-2000 and GSM 900 bands, etc. As another example, SD may send a request for a preferred search, followed by a request for a full search, etc. Although not shown in FIGS. 4A to 4C, SD may set a new_search flag to 'true' when sending a new search request, e.g., for a different band group or a different type of search. NAS may reset the search done indication, and RRC and RR may reset their search done indications and search state information when the new_search flag is set to 'true'.

Timers may be used to implement UOOS search while in the OOS state. In certain instances, it may be desirable to complete a given search as soon as possible, e.g., for an emergency call. A use_timer flag may be set to either (i) "true" to indicate use of the search timer for each RAT and to save state information when the timer expires or (ii) 'false' to indicate bypass of the search timer and to complete the search and report the search results.

FIGS. 4A to 4C show a specific design of UOOS search for UMTS and GSM. In general, the UOOS search may be initiated and managed by any module(s) within the wireless device. In the design shown in FIGS. 4A to 4C, various search parameters such as $T_{cycle}$, $T_{awake}$, $T_{UMTS}$, $T_{GSM}$, search type, band group, timer control, etc. may be set or controlled by SD. This design may allow for easy access (e.g., by a service provider) to set these search parameters to achieve the desired performance, without having to modify the operation of NAS, RRC, RR, and lower layers. In other designs, NAS, RRC and RR may set and/or control the search parameters.

2. UOOS Search for 1X and HRPD

The wireless device may search for a signal on a particular 1X channel by detecting for pilot sent in the signal. To detect for the pilot, the wireless device may correlate a received signal with a pseudo-random number (PN) sequence at different offsets. For each PN offset, the wireless device may multiply the received samples with the PN sequence at that offset and coherently accumulate the results in each time interval of $N_C$ chips to obtain a complex value for that time interval. The wireless device may non-coherently accumulate the squared magnitude of the complex values for $N_{NC}$ time intervals to obtain pilot energy. The wireless device may then compare the pilot energy against a threshold to determine whether or not a signal is present on the 1X channel.

The wireless device may attempt full acquisition on a given 1X channel to detect for a 1X system. Full acquisition may include a combination of deep acquisition and shallow acquisition. For deep acquisition, the coherent integration interval ($N_C$) and the non-coherent integration interval ($N_{NC}$) may be selected such that a signal with a low signal-to-noise ratio (SNR) can be acquired. For shallow acquisition, $N_C$ and $N_{NC}$ may be selected such that a signal with a larger frequency offset can be acquired. In one design, $N_C=96$ and $N_{NC}=2$ for deep acquisition, and $N_C=64$ and $N_{NC}=2$ for shallow acquisition. Other values may also be used for $N_C$ and $N_{NC}$.

The wireless device may also perform a micro search for a set of 1X channels. For the micro search, the wireless device may measure the received power of each 1X channel and identify strong 1X channels for possible acquisition.

Figure 5:
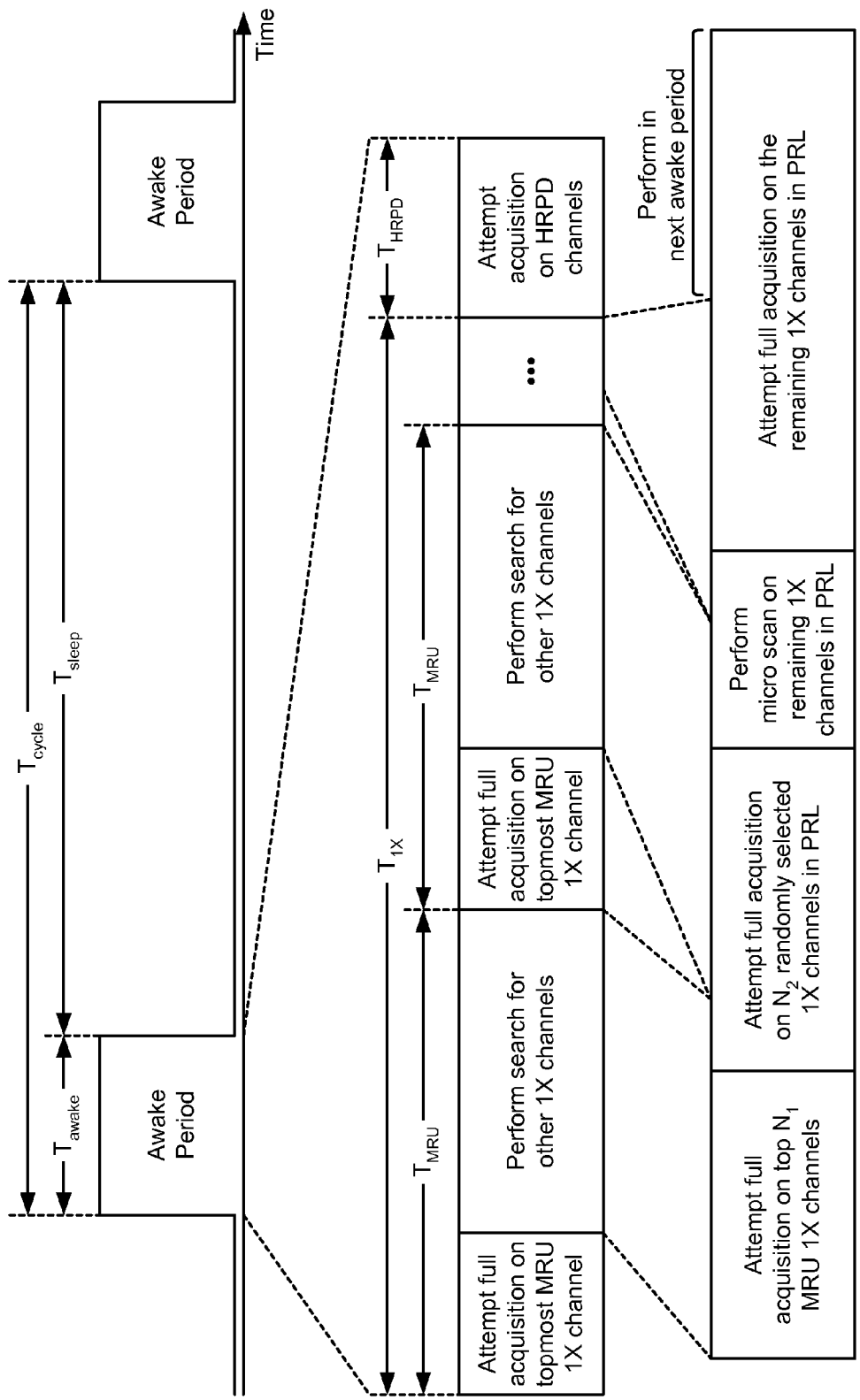
FIG. 5 shows a design of UOOS search for 1X and HRPD.

In one design, the wireless device may perform UOOS search for 1X and HRPD as follows. In each awake period, the wireless device may:

1. Set 1X search timer to $T_{1X}$ and start the timer,
2. Perform full acquisition on the topmost most recently used (MRU) 1X channel every $T_{MRU}$ seconds during the 1X search time,
3. Attempt full acquisition on top $N_1$ MRU 1X channels,
4. Attempt full acquisition on $N_2$ randomly selected 1X channels in the PRL,
5. Perform micro search on remaining 1X channels in the PRL until the 1X search timer expires,
6. If the micro search is competed and the 1X search timer has not expired then go to step 7, else go to step 8,
7. Attempt full acquisition on the remaining 1X channels until the 1X search timer expires,
8. Save 1X search state information and put 1X protocol stack in sleep state,
9. Set HRPD search timer to $T_{HRPD}$ and start the timer,
10. Attempt deep acquisition on topmost MRU HRPD channel,
11. Attempt deep acquisition on one or more randomly selected HRPD channels in the PRL until the HRPD search timer expires,
12. Save HRPD search state information and put HRPD protocol stack in sleep state,
13. Start sleep timer, and
14. Remain in the sleep state until the sleep timer expires FIG. 5 shows a design of a timeline for the UOOS search for 1X and HRPD. The wireless device may wake up for $T_{awake}$ seconds and sleep for $T_{sleep}$ seconds in each sleep cycle. In each awake period of $T_{awake}$ seconds, $T_{1X}$ seconds may be allocated for 1X search, and $T_{HRPD}$ seconds may be allocated for HRPD search.

For the 1X search, full acquisition may be attempted on the topmost MRU 1X channel in each interval of $T_{MRU}$ seconds within the 1X search time of $T_{1X}$ seconds. The topmost MRU 1X channel may be the 1X channel that was acquired most recently, so the likelihood of re-acquiring this 1X channel may be greater. Full acquisition may also be attempted on $N_1$ top MRU 1X channels followed by $N_2$ randomly selected 1X channels in the PRL. The 1X channels in the PRL may be marked so that each 1X channel may be selected once in each iteration through the PRL. If full acquisition on the $N_2$ randomly selected 1X channels is completed prior to expiration of the 1X search timer, then a micro scan may be performed on the remaining 1X channels in the PRL. Full acquisition may then be performed on the remaining 1X channels until the 1X search timer expires. 1X search state information may be saved whenever the 1X search timer expires, so that in the next awake period the 1X search may be resumed from where it was paused.

For the HRPD search, deep acquisition may be attempted on the topmost MRU HRPD channel and also on one or more randomly selected HRPD channels in the PRL until the HRPD search timer expires. The HRPD channels in the PRL may be marked so that each HRPD channel may be selected once in each iteration through the PRL.

The search parameters $N_1$, $N_2$, $T_{sleep}$, $T_{awake}$, $T_{1X}$, $T_{HRPD}$ and $T_{MRU}$ may be set to suitable values to achieve the desired performance. In one design, $N_1=2$, $N_2=6$, $T_{sleep}=36$, $T_{awake}=6$, $T_{1X}=5$, $T_{HRPD}=1$, and $T_{MRU}=2$. These parameters may also be set to other values in other designs.

FIG. 5 shows a specific design of UOOS search for 1X and HRPD. UOOS search for 1X and HRPD may also be performed in other manners. For example, full acquisition may be attempted on the topmost MRU 1X channel only once in each awake period (instead of in each interval of $T_{MRU}$ seconds within the 1X search time). Other 1X and HRPD channels not in the PRL may also be searched.

3. General UOOS Search

FIG. 6 shows a design of a process 600 for performing UOOS search by a wireless device. The wireless device may transition to an OOS state upon detection of OOS conditions for a radio access technology (block 610). For example, the wireless device may detect OOS conditions if (i) no systems are acquired after performing system search at power up, (ii) a paging channel is unsuccessfully demodulated for a predetermined number of paging slots while in the idle mode, (iii) a serving cell is lost and not re-acquired within a predetermined time duration while in the connected mode, or (iv) some other criterion is met. The wireless device may support multiple RATs and may or may not encounter OOS conditions for each RAT. The wireless device may perform UOOS search for each RAT in which the OOS conditions are detected.

The wireless device may perform system search during an awake period of each sleep cycle while in the OOS state (block 620). The awake period may have a first fixed time duration, and each sleep cycle may have a second fixed time duration, as shown in FIG. 2A. The awake period may have a fixed time duration, and sleep cycle may have a variable time duration, as shown in FIG. 2B. The awake period for each sleep cycle may also be a fixed percentage of the sleep cycle, as shown in FIG. 2C. In any case, in each awake period, the wireless device may resume the system search based on state information saved in a prior awake period if the system search was not completed in the prior awake period. The wireless device may save state information for the system search if it is not completed in the current awake period. The system search may be paused at the end of an awake period in a first search mode (e.g., with a use_timer flag set to 'true') and may be completed past the end of the awake period, if necessary, in a second search mode (e.g., with the use_timer flag set to 'false'). The wireless device may transition out of the OOS state upon acquisition of a system suitable for obtaining service (block 630).

FIG. 7 shows a design of a process 700 for performing system search while in the OOS state. Process 700 may be used for block 620 in FIG. 6. The wireless device may perform a first search for a first set of at least one entry in each awake period, with the first search being started and completed in the awake period (block 710). The first set of at least one entry may include at least one frequency channel and system acquired recently and stored in an acquisition database, e.g., a predetermined number of most recently acquired frequency channels and systems in the acquisition database. The first search may be performed (i) once in each awake period, e.g., as shown in FIGS. 4A to 4C, (ii) once in each predetermined time interval during the awake period, or (iii) in some other manner, e.g., as shown in FIG. 5.

The wireless device may perform a second search for a second set of at least one entry in each awake period, with the second search being started or resumed in the awake period (block 720). If the second search was not completed in a prior awake period, then the second search may be resumed in the current awake period based on state information saved in the prior awake period. If the second search is not completed in the current awake period, then state information for the second search may be saved for use in the next awake period. The second search may also be skipped if a suitable system is found by the first search. The second set of at least one entry may include at least one frequency channel and system in a preferred list of systems, e.g., a predetermined number of frequency channels randomly selected from the preferred list. The second set of at least one entry may include different frequency channels and systems each time the second search is started, so that all frequency channels and systems of interest may be searched. At least one frequency band may also be selected from among multiple frequency bands each time the second search is started, and the second set of at least one entry may include frequency channels in the at least one selected frequency band.

In each awake period, a search for a first RAT may be performed in a first interval of the awake period if this search is enabled. A search for a second RAT may be performed in a second interval of the awake period if this search is enabled. The searches for the first and second RATs may be part of the first search in block 710 and/or the second search in block 720. The search for one RAT (e.g., the second RAT) may be disabled if it is completed prior to the search for the other RAT (e.g., the first RAT), e.g., as shown in FIG. 4C. The search for the other RAT may then be performed in the entire awake period. The first RAT may be UMTS and the second RAT may be GSM. The first RAT may also be CDMA2000 1X and the second RAT may be HRPD. System search may also be performed for some other combination of RATs and/or for more than two RATs.

The UOOS search described herein may provide certain advantages over a non-uniform OOS search. The non-uniform OOS search may search continuously or more often, and possibly more aggressively (e.g., in terms of the number of frequency channels or bands), during the first part (e.g., the first few minutes or tens of minutes) of OOS. The non-uniform OOS search may thereafter relax search activity (e.g., in terms of how often full searches are done) in order to conserve battery power. The non-uniform OOS search may significantly delay system acquisition if the OOS duration is long (e.g., more than 15-20 minutes) and if the desired frequency channel is not in the acquisition database. The non-uniform OOS search may also result in non-uniform battery power consumption, which may make it difficult to predict battery life under OOS conditions. The UOOS search may address these two issues. The UOOS search may have faster system acquisition of new frequency channel under long OOS durations (e.g., more than 15 minutes) and may also allow for estimation of OOS battery life in a straightforward manner.

The wireless device may ensure that a transition between the connected mode and the idle mode occurs in a graceful fashion for UOOS operation, e.g., the handling of timer expires, etc. is not affect by the transition. The sleep and awake timers (e.g., $T_{sleep}$ and $T_{awake}$) for UOOS operation may be same for both the connected and idle modes. User activity, SIM and/or other triggers may bring the wireless device out of UOOS operation and into the idle or connected mode of operation.

Figure 8:
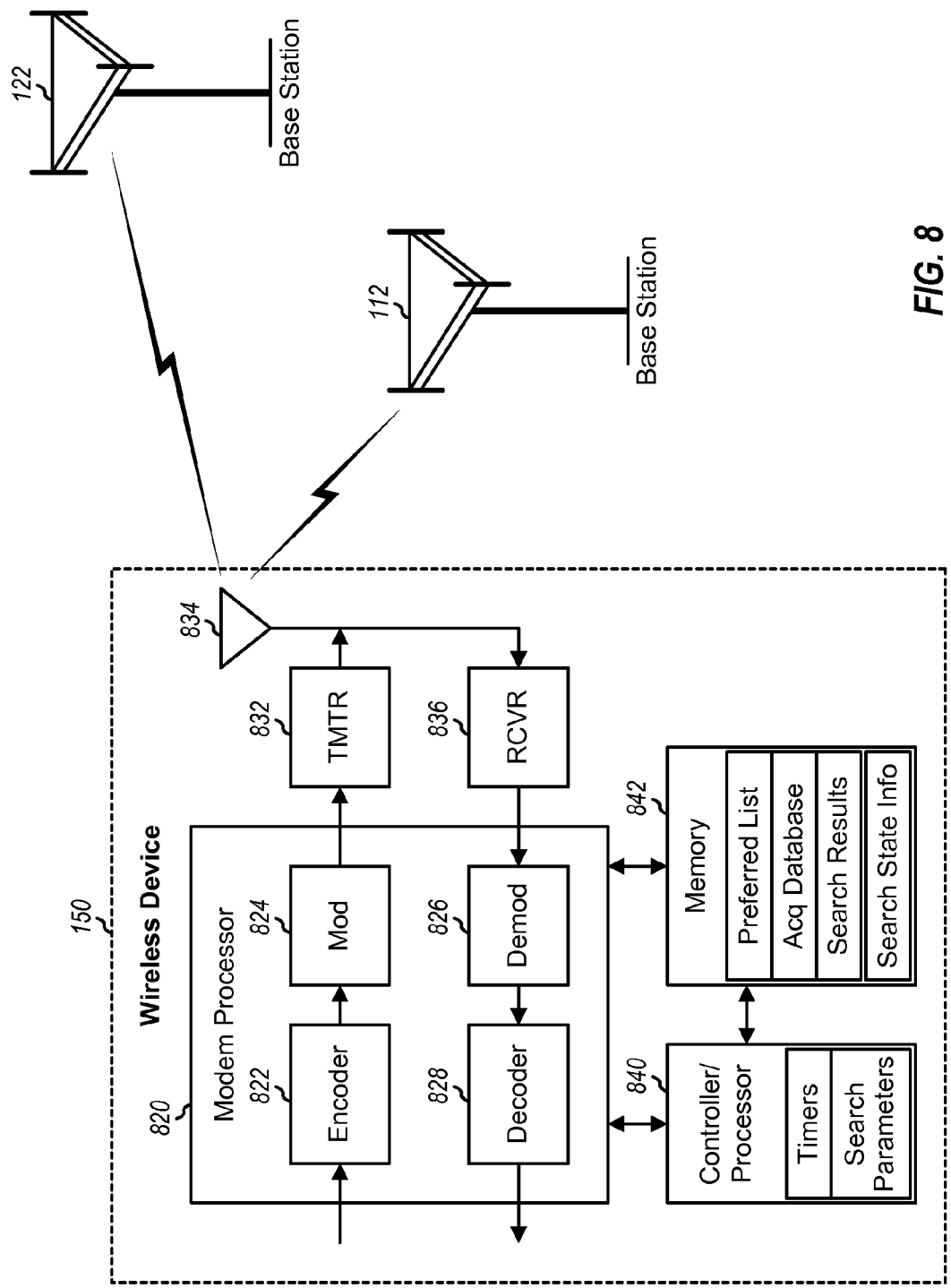
FIG. 8 shows a block diagram of a wireless device.

FIG. 8 shows a block diagram of a design of wireless device 150 in FIG. 1. On the uplink or reverse link, data and signaling to be sent by wireless device 150 are processed (e.g., formatted, encoded, and interleaved) by an encoder 822 and further processed (e.g., modulated, channelized, and scrambled) by a modulator (Mod) 824 in accordance with an applicable RAT (e.g., UMTS, GSM, 1X, HRPD, etc.) to generate output chips. A transmitter (TMTR) 832 then conditions (e.g., converts to analog, filters, amplifies, and frequency upconverts) the output chips and generates an uplink signal, which is transmitted via an antenna 834.

On the downlink or forward link, antenna 834 receives downlink signals transmitted by the base stations (e.g., base stations 112 in first system 110 and/or base stations 122 in second system 120 in FIG. 1) and provides a received signal. A receiver (RCVR) 836 conditions (e.g., filters, amplifies, frequency downconverts, and digitizes) the received signal and provides samples. A demodulator (Demod) 826 processes (e.g., descrambles, channelizes, and demodulates) the samples and provides symbol estimates. A decoder 828 further processes (e.g., deinterleaves and decodes) the symbol estimates and provides decoded data. Encoder 822, modulator 824, demodulator 826, and decoder 828 may be implemented by a modem processor 820. These units perform processing in accordance with the RAT (e.g., UMTS, GSM, 1X, HRPD, etc.) being received. For example, demodulator 826 may perform descrambling with scrambling sequences, despreading with orthogonal codes, and data demodulation for UMTS, 1X or HRPD. Demodulator 826 may perform matched filtering and equalization for GSM.

A controller/processor 840 controls the operation at wireless device 150. A memory 842 stores data and program codes for wireless device 150. Controller/processor 840 may implement process 600 in FIG. 6, process 700 in FIG. 7, and/or other processes for UOOS search. For UMTS and GSM, controller/processor 840 may implement SD, NAS, RRC, RR, and/or other modules. Controller/processor 840 may also implement timers for sleep period, awake period, and search period for each RAT. Controller/processor 840 and/or memory 842 may store search state information for each RAT for which a search is not completed, search parameters, and/or other information for searches. Memory 842 may store a preferred list of systems or PLMNs, the acquisition (Acq) database, search results, etc.

The search techniques described herein may be implemented by various means. For example, these techniques may be implemented in hardware, firmware, software, or a combination thereof. For a hardware implementation, the processing units used to perform UOOS search may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

For a firmware and/or software implementation, the search techniques may be implemented with modules (e.g., procedures, functions, etc.) that perform the functions described herein. The firmware and/or software instructions may be stored in a memory (e.g., memory 842 in FIG. 8) and executed by a processor (e.g., processor 840). The memory may be implemented within the processor or external to the processor. The firmware and/or software instructions may also be stored in other processor-readable medium such as random access memory (RAM), read-only memory (ROM), non-volatile random access memory (NVRAM), programmable read-only memory (PROM), electrically erasable PROM (EEPROM), FLASH memory, compact disc (CD), magnetic or optical data storage device, etc.

An apparatus implementing the techniques described herein may be a stand-alone unit or may be part of a device. The device may be (i) a stand-alone integrated circuit (IC), (ii) a set of one or more ICs that may include memory ICs for storing data and/or instructions, (iii) an ASIC such as a mobile station modem (MSM), (iv) a module that may be embedded within other devices, (v) a cellular phone, wireless device, handset, or mobile unit, (vi) etc.

Headings are included herein for reference and to aid in locating certain sections. These headings are not intended to limit the scope of the concepts described therein under, and these concepts may have applicability in other sections throughout the entire specification.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. An apparatus comprising:
at least one processor configured to transition to an out-of-service (OOS) state upon detection of OOS conditions for a radio access technology, and to perform system search for a wireless system suitable for acquisition to transition out of the OOS state during an awake period of each sleep cycle while in the OOS state, the awake period having a first fixed time duration and each sleep cycle having a second fixed time duration; and
a memory coupled to the at least one processor,
wherein the at least one processor is configured to resume, in a current awake period of a current sleep cycle in the OOS state, the system search based on state information saved in a prior awake period of a prior sleep cycle in the OOS state if the system search is not completed in the prior awake period, and to save state information for the system search if not completed in the current awake period of the current sleep cycle in the OOS state.

2. An apparatus comprising:
at least one processor configured to transition to an out-of-service (OOS) state upon detection of OOS conditions for a radio access technology, and to perform system search for a wireless system suitable for acquisition to transition out of the OOS state during an awake period of each sleep cycle while in the OOS state, the awake period having a first fixed time duration and each sleep cycle having a second fixed time duration; and
a memory coupled to the at least one processor,
wherein the system search comprises first and second searches, and
wherein the at least one processor is configured to perform in the awake period of each sleep cycle in the OOS state the first search for a first set of at least one entry, the first search being started and completed in the awake period, and to perform the second search for a second set of at least one entry, the second search being started or resumed in the awake period.

3. The apparatus of claim 2, wherein the at least one processor is configured to resume the second search in the awake period of each sleep cycle in the OOS state based on state information saved in a prior awake period of a prior sleep cycle in the OOS state if the second search is not completed in the prior awake period, and to save state information for the second search if not completed in the awake period.

4. The apparatus of claim 2, wherein the at least one processor is configured to skip the second search if a wireless system suitable for acquisition is found by the first search.

5. The apparatus of claim 2, wherein the at least one processor is configured to perform the first search once in each awake period while in the OOS state.

6. The apparatus of claim 2, wherein each awake period includes a plurality of predetermined time intervals, and wherein the at least one processor is configured to perform the first search in each of the predetermined time intervals.

7. The apparatus of claim 2, wherein the first set of at least one entry includes at least one frequency channel and system acquired recently and stored in an acquisition database.

8. The apparatus of claim 2, wherein the memory is configured to store an acquisition database of frequency channels and systems acquired recently, and wherein the first set of at least one entry includes a predetermined number of most recently acquired frequency channels and systems in the acquisition database.

9. The apparatus of claim 2, wherein the second set of at least one entry includes at least one frequency channel and system in a preferred list of systems.

10. The apparatus of claim 2, wherein the second set of at least one entry includes a predetermined number of frequency channels randomly selected from a preferred list of systems.

11. The apparatus of claim 2, wherein the second set of at least one entry includes different frequency channels each time the second search is started.

12. The apparatus of claim 2, wherein the at least one processor is configured to select at least one frequency band from among multiple frequency bands each time the second search is started, and wherein the second set of at least one entry includes frequency channels in the at least one selected frequency band.

13. The apparatus of claim 1, wherein the at least one processor is configured to detect OOS conditions if a paging channel is unsuccessfully demodulated for a predetermined number of paging slots.

14. The apparatus of claim 1, wherein the at least one processor is configured to detect OOS conditions if no system is acquired after performing system search at power up.

15. The apparatus of claim 1, wherein the at least one processor is configured to detect OOS conditions if a serving cell is lost and not re-acquired within a predetermined time duration.

16. The apparatus of claim 1, wherein the at least one processor is configured to transition out of the OOS state upon acquisition of a wireless system suitable for obtaining service.

17. A method comprising:
transitioning to an out-of-service (OOS) state upon detection of OOS conditions for a radio access technology; and
performing system search for a wireless system suitable for obtaining service to transition out of the OOS state during an awake period of each sleep cycle while in the OOS state, the awake period having a first fixed time duration and each sleep cycle having a second fixed time duration,
wherein the performing system search during a current awake period of a current sleep cycle in the OOS state comprises
resuming the system search based on state information saved in a prior awake period of a prior sleep cycle if the system search is not completed in the prior awake period, and
saving state information for the system search if not completed in the current awake period of the current sleep cycle.

18. A method comprising:
transitioning to an out-of-service (OOS) state upon detection of OOS conditions for a radio access technology; and
performing system search for a wireless system suitable for obtaining service to transition out of the OOS state during an awake period of each sleep cycle while in the OOS state, the awake period having a first fixed time duration and each sleep cycle having a second fixed time duration, wherein the performing system search during the awake period of each sleep cycle while in the OOS state comprises
performing a first search for a first set of at least one entry, the first search being started and completed in the awake period, and
performing a second search for a second set of at least one entry, the second search being started or resumed in the awake period.

19. The method of claim 18, wherein the first set of at least one entry includes at least one frequency channel and system acquired recently and stored in an acquisition database, and wherein the second set of at least one entry includes at least one frequency channel and system in a preferred list of systems.

20. An apparatus comprising:
means for transitioning to an out-of-service (OOS) state upon detection of OOS conditions for a radio access technology; and
means for performing system search for a wireless system suitable for obtaining service to transition out of the OOS state during an awake period of each sleep cycle while in the OOS state, the awake period having a first fixed time duration and each sleep cycle having a second fixed time duration,
wherein the means for performing system search during the awake period of each sleep cycle comprises
means for resuming, in a current awake period of a current sleep cycle in the OOS state, the system search based on state information saved in a prior awake period of a prior sleep cycle in the OOS state if the system search is not completed in the prior awake period, and
means for saving state information for the system search if not completed in the current awake period of the current sleep cycle in the OOS state.

21. An apparatus comprising:
means for transitioning to an out-of-service (OOS) state upon detection of OOS conditions for a radio access technology; and
means for performing system search for a wireless system suitable for obtaining service to transition out of the OOS state during an awake period of each sleep cycle while in the OOS state, the awake period having a first fixed time duration and each sleep cycle having a second fixed time duration, wherein the means for performing system search during the awake period of each sleep cycle comprises
means for performing in the awake period of each sleep cycle in the OOS state a first search for a first set of at least one entry, the first search being started and completed in the awake period, and
means for performing a second search for a second set of at least one entry, the second search being started or resumed in the awake period.

22. A non-transitory processor-readable medium for storing instructions and when the instructions are executed by a processor, cause the processor to perform steps comprising:
transition to an out-of-service (OOS) state upon detection of OOS conditions for a radio access technology;
perform system search for a wireless system suitable for obtaining service to transition out of the OOS state during an awake period of each sleep cycle while in the OOS state, the awake period having a first fixed time duration and each sleep cycle having a second fixed time duration;
resume, in a current awake period of a current sleep cycle in the OOS state, the system search based on state information saved in a prior awake period of a prior sleep cycle in the OOS state if the system search is not completed in the prior awake period; and
save state information for the system search if not completed in the current awake period of the current sleep cycle in the OOS state.

23. A non-transitory processor-readable medium for storing instructions that when executed by a processor cause the processor to perform steps of:
transition to an out-of-service (OOS) state upon detection of OOS conditions for a radio access technology; and
perform system search for a wireless system suitable for obtaining service to transition out of the OOS state during an awake period of each sleep cycle while in the OOS state, the awake period having a first fixed time duration and each sleep cycle having a second fixed time duration, and further for storing instructions to, in each awake period
perform in the awake period of each sleep cycle in the OOS state a first search for a first set of at least one entry, the first search being started and completed in the awake period, and
perform a second search for a second set of at least one entry, the second search being started or resumed in the awake period.

24. The apparatus of claim 1, wherein the at least one processor is further configured to perform, upon the system search in the current awake period of the current sleep cycle in the OOS state detecting a wireless system suitable for obtaining service, an acquisition of the detected wireless system and, upon acquisition of the detected wireless system, to transition out of the OOS state.

25. The apparatus of claim 1, wherein the memory is configured to store an acquisition database of N most recently used frequency channels, including a topmost most recently used frequency channel, and wherein the at least one processor is configured to include in the system search:
- an attempt to fully acquire the topmost most recently used frequency channel, and
- if said attempt does not fully acquire the topmost most recently used frequency channel, a search of other frequency channels to detect a wireless system suitable for obtaining service.

26. The apparatus of claim 25, wherein the memory is further configured to store a preferred roaming list of frequency channels, and wherein the at least one processor is configured to include in said search of other frequency channels an attempt to fully acquire each of a randomly selected plurality of frequency channels from said preferred roaming list.

27. The apparatus of claim 26, wherein the at least one processor is configured to perform, if said attempt to fully acquire each of a plurality of frequency channels randomly selected from said preferred roaming list does not fully acquire a wireless system suitable for acquisition, a microscan of remaining frequency channels in said preferred roaming list.

28. The method of claim 17, wherein the method further comprises, if the system search during the current awake period of the current sleep cycle in the OOS state detects a wireless system suitable for obtaining service, acquiring said wireless system and transitioning out of the OOS state.

29. The method of claim 17, further comprising: storing an acquisition database of N most recently used frequency channels, including a topmost most recently used frequency channel, and wherein performing the system search comprises:
- attempting to fully acquire the topmost most recently used frequency channel, and
- if said attempting does not fully acquire the topmost most recently used frequency channel, searching other frequency channels to detect a wireless system suitable for obtaining service.

30. The method of claim 29, further comprising storing a preferred roaming list of frequency channels, and wherein said searching other frequency channels includes attempting to fully acquire each of a randomly selected plurality of frequency channels from said preferred roaming list.

31. The method of claim 30, further comprising, if said attempting to fully acquire each of a plurality of frequency channels randomly selected from said preferred roaming list does not fully acquire a wireless system suitable for acquisition, microscanning remaining frequency channels in said preferred roaming list.

32. The apparatus of claim 20, further comprising means for storing an acquisition database of N most recently used frequency channels, including a topmost most recently used frequency channel, and wherein the means for performing system search further comprises:
- means for attempting to fully acquire the topmost most recently used frequency channel, and
- means for searching other frequency channels, if said attempting does not fully acquire the topmost most recently used frequency channel, to detect a wireless system suitable for obtaining service.

33. The apparatus of claim 32, further comprising means for storing a preferred roaming list of frequency channels, and wherein said means for searching other frequency channels includes means for attempting to fully acquire each of a randomly selected plurality of frequency channels from said preferred roaming list.

34. The apparatus of claim 33, further comprising means for microscanning remaining frequency channels in said preferred roaming list.

35. The non-transitory processor-readable medium of claim 23, further storing instructions that when executed by a processor, cause the processor, if the system search during the current awake period of the current sleep cycle in the OOS state detects a wireless system suitable for obtaining service, to acquire said wireless system and to transition out of the OOS state.

36. The non-transitory processor-readable medium of claim 23, further storing instructions that when executed by a processor, cause the processor to store an acquisition database of N most recently used frequency channels, including a topmost most recently used frequency channel, and wherein the instructions that when executed by a processor cause the processor to perform the system search include instructions that when executed by a processor, cause the processor to:
- attempt to fully acquire the topmost most recently used frequency channel, and
- if said attempt does not fully acquire the topmost most recently used frequency channel, to search other frequency channels to detect a wireless system suitable for obtaining service.

37. The non-transitory processor-readable medium of claim 36, further storing instructions that when executed by a processor, cause the processor to store in the acquisition database a preferred roaming list of frequency channels, and wherein the instructions that when executed by a processor cause the processor to search other frequency channels include instructions that when executed by a processor, cause the processor to attempt to fully acquire each of a randomly selected plurality of frequency channels from said preferred roaming list.

* * * * *